Patented Mar. 28, 1933

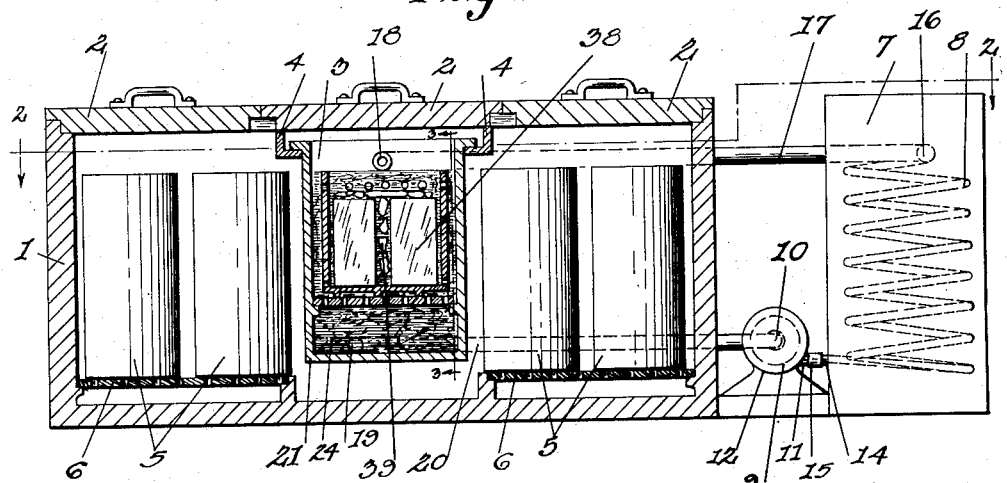
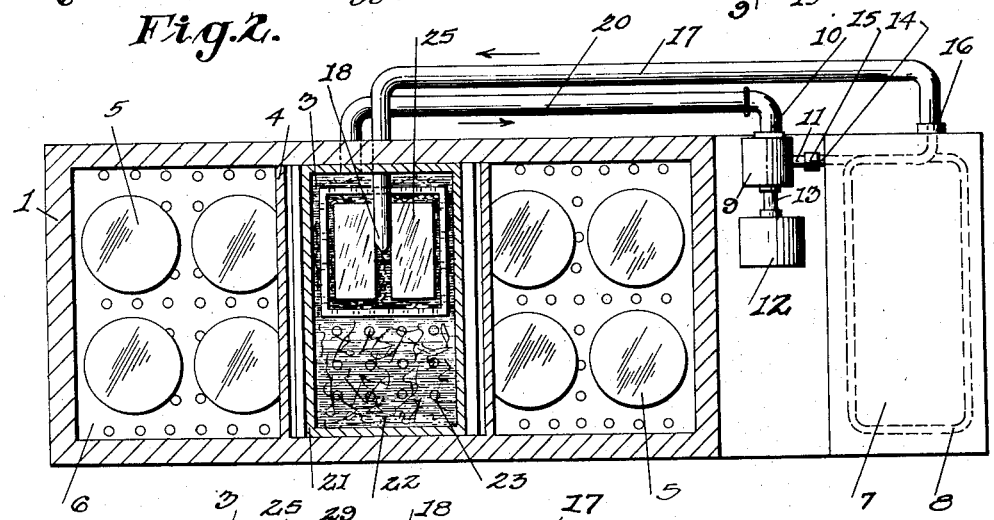
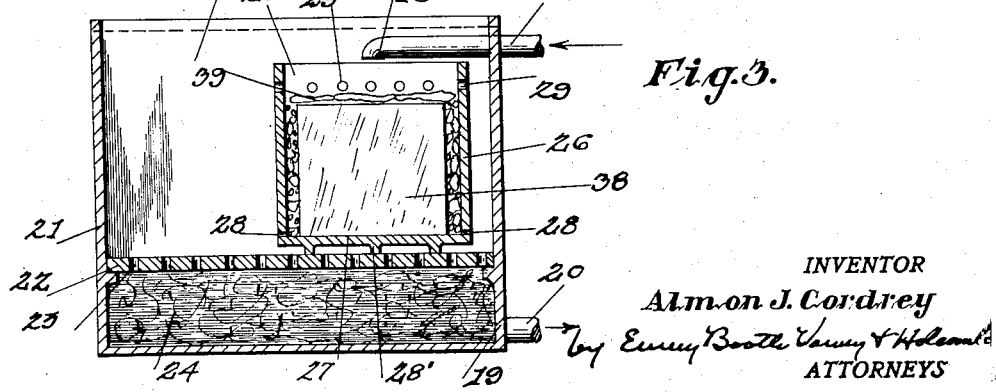

1,903,170

UNITED STATES PATENT OFFICE

ALMON J. CORDREY, OF DETROIT, MICHIGAN, ASSIGNOR TO ZERO ICE CORPORATION, A CORPORATION OF MICHIGAN

SOLID-$CO_2$ REFRIGERATING SYSTEM

Application filed December 21, 1931. Serial No. 582,410.

My invention relates to refrigerating systems employing solid-$CO_2$ or like vaporizable solid substance as the primary cooling agent, and particularly relates to the use of the solid-$CO_2$ for direct refrigeration by means of the vapor given off and for chilling brine or other liquid secondary refrigerating media capable of being circulated for external refrigeration work.

My invention aims to provide a solid-$CO_2$ chilling unit through which the liquid secondary refrigerant may be circulated for chilling to any desired degree without becoming congealed. A further aim is to utilize the chilling unit itself as a cooling means for the surroundings.

My invention lies in partly or wholly submerging the solid-$CO_2$ in a substantially trapped portion of the liquid refrigerant, whereby a layer of frozen refrigerant is formed over the solid-$CO_2$ and is used as the direct means for chilling the circulating refrigerant which is passed thereover at a sufficient rate to keep it from congealing.

Ordinarily a brine, such as calcium chloride solution, would be used as the secondary refrigerant. Brine cannot be made concentrated enough to remain liquid at a temperature below $-60°$ F. to $-65°$ F. and hence will freeze when brought into close proximity to solid-$CO_2$, which has a temperature of $-109°$ F. Consequently, if the circulating brine was chilled directly by the solid-$CO_2$ portions of it would freeze and thus interfere with the circulation. Furthermore, only one temperature gradient could be obtained (temperature of the solid-$CO_2$ minus the temperature of the incoming brine) and it would not be possible to regulate the rate of chilling at a particular predetermined rate of flow of brine and area of contact. This would require that the apparatus be constructed differently in each case where the brine was employed to do a greater or lesser amount of refrigerating work.

By my invention, however, the circulating brine is passed over a layer of frozen brine which separates it from the solid-$CO_2$. This area of chilling exposure can be fixed at any temperature above $-65°$ F. and below $32°$ F. by adjusting the concentration of the brine so that the freezing point of the brine will correspond to the temperature desired. In this way a wide variation in temperature gradient can be secured and thus varying amounts of heat can be extracted from the circulating brine as conditions require, without having to change the rate of flow of the brine or the area of chilling.

For example—with an incoming brine temperature of $-10°$ F. and frozen-brine-layer temperature of $-30°$ F., there would be a temperature gradient of $20°$ and a certain amount of heat would be absorbed from the circulating brine. If it was desired to double the amount of heat absorption to correspond to a doubling of the refrigeration work required of the brine, this could be accomplished by simply increasing the brine strength until its freezing point was lowered to $-50°$ F. and thus establishing a temperature gradient of $40°$. Thus the heat absorbing capacity of the solid-$CO_2$ chilling unit would be doubled without any change in the apparatus. The foregoing figures are only given to illustrate the principle involved and are not intended to accurately set forth the precise change in gradient required.

Further objects and features of my invention will be evident from the more detailed description hereafter.

In the accompanying drawings, wherein I have shown two embodiments of my invention for purposes of illustration, Fig. 1 shows a vertical section of an ice cream manufacturing and hardening apparatus constructed in accordance with details of the present invention;

Fig. 2 shows a plan view of the same taken on the line 2—2 of Fig. 1;

Fig. 3 shows an enlarged section of the solid-$CO_2$ chilling unit on the line 3—3 of Fig. 1;

Figure 4:
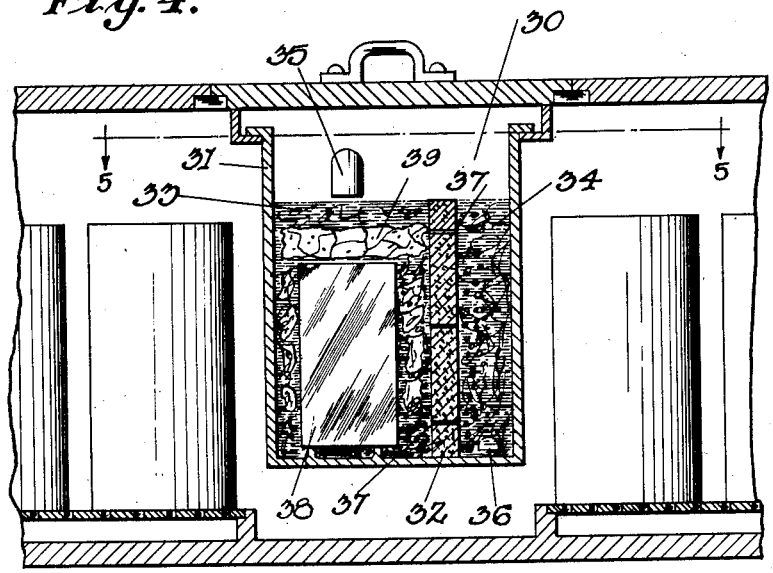
Fig. 4 shows a vertical section of the central part of the hardening cabinet containing a second embodiment of my solid-$CO_2$ chilling unit.

In the first embodiment of my invention selected for illustration herein and shown in Figs. 1, 2 and 3, wherein like reference characters designate like parts, the ice cream hardening cabinet 1, which is provided with removable tops 2 to give ready access to the interior, has solid-$CO_2$ chilling unit 3 occupying the upper central space, where it is supported by pendent brackets 4, or by other suitable means, whereby it is spaced above the bottom of the cabinet. The end spaces of the cabinet provide places for the cans of ice cream 5 which are to be cooled and which are spaced above the cabinet bottom by means of perforated plates 6 to permit of more uniform cooling.

The ice cream manufacturing apparatus 7 may be of any desired type, and preferably is provided with a brine cooling coil 8 or other means for chilling it by brine circulated from the chilling unit 3 as by a liquid transfer pump 9 with inlet 10 and outlet 11, which is driven by motor 12 by means of shaft 13, for example, and connected to the inlet 14 of brine coil 8 by pipe 15. To complete the circuit, the outlet 16 of brine coil 8 is connected by pipe 17 to the inlet 18 of solid-$CO_2$ chilling unit 3, and the outlet 19 of unit 3 is connected by pipe 20 to the inlet 10 of pump 9.

Referring more particularly to the details of the solid-$CO_2$ chilling unit shown in Fig. 3, it comprises an outer metallic tank 21 of rectangular shape and open at the top. Spaced above the bottom is a floor 22 perforated by a plurality of holes 23. The space 24 below this floor forms a brine compartment 24 from which the brine outlet 19 leads to the pump 9.

Resting on floor 23 and separated by supports 28' is the solid-$CO_2$ compartment 25 having metallic side walls 26 and bottom 27.

The volume of brine compartment 24 is substantially greater than that of solid-$CO_2$ compartment 25.

Brine inlet 18 discharges above solid-$CO_2$ compartment 25.

At the bottom of side walls 26 are a plurality of small bleeder or leak holes 28. The upper edges of the side walls are perforated by a number of evenly spaced brine overflow holes 29.

The operation of the system is as follows:

A calcium chloride brine solution is made up of the proper strength to have the desired freezing point. This is placed in the circulating system and solid-$CO_2$ is submerged therein in the compartment 25 and will sublimate, giving off $CO_2$ gas which reacts with the brine to form a small amount of HCl. When as much of this acid has been formed as is possible, the solution is saturated with NaOH which will neutralize the HCl and prevent the solution from becoming acidified when further amounts of solid-$CO_2$ are submerged therein. In this way a brine solution is obtained which will be harmless to metals and which will remain harmless, and in which $CO_2$ will no longer dissolve.

Solid-$CO_2$ compartment 25 is exposed, pump 9 started, and brine treated as above is poured into brine compartment 24. It will be drawn out through outlet 19 and pass through the circulating system, returning through brine inlet 18. Brine treated as above described is added until the compartment 24 is substantially filled. The system is now ready for use.

Solid-$CO_2$ compartment 25 is filled with cakes of solid-$CO_2$ 38 and placed under inlet 18. The compartment 24 has walls high enough so that space will remain between the top of the solid $CO_2$ and the level of overflow holes 29.

The brine from inlet 18 will now submerge the solid-$CO_2$ and will overflow through holes 29 and flow down into brine compartment 24 through holes 23 in the floor 22.

The brine in close proximity to the solid-$CO_2$ will quickly freeze and will form a frozen brine surface 39 above the $CO_2$. Incoming brine will flow on to this surface and out through holes 29 in the side walls. Or, these holes may be dispensed with and the brine allowed to overflow the top edges of the side walls 26.

Thus the incoming brine, after equilibrium has been reached, will not come in contact with the solid-$CO_2$, or only to a small extent, but will be chilled by contact with the layer of frozen brine 39 thereabove. The rate of flow from inlet 18 is sufficiently great to cause the brine to overflow the solid-$CO_2$ compartment before it has had time to congeal.

By varying the brine concentration and hence the temperature of the frozen brine layer, the incoming brine may be chilled to varying degrees, as required.

The purpose of bleeder holes 28 is to permit the brine to drain from compartment 28 when the pump is stopped and also to allow small amounts of brine to leak out during operation and to permit the escape of $CO_2$ gas if it is hindered from rising. In this way operating conditions are more uniformly maintained.

Referring to Figs. 1, 2 and 3, it will be seen that the solid-$CO_2$ chilling unit 3 serves not only to cool the space within hardening cabinet 1 in the same manner as if solid-$CO_2$ were used for that purpose alone, but also simultaneously chills a brine solution which is circulated by pump 9 to and from external brine coil 8 which is employed for refrigeration in manufacturing apparatus 7.

By stopping pump 9, the solid-$CO_2$ can be employed solely for cooling the hardening cabinet.

In either case, the $CO_2$ gas given off by the sublimating solid-$CO_2$ will pass into the hardening cabinet proper, since it is insoluble in the submerging brine, and may be made to pass into the side walls and bottom for insulating and drying purposes. My copending application, Ser. No. 530,622, filed April 16, 1931, shows one way in which this may be done.

Figure 5:
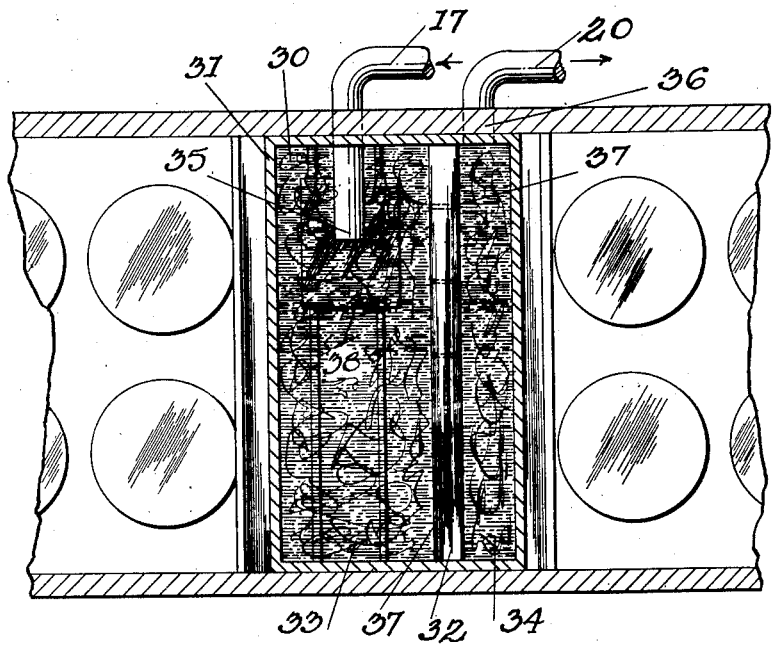
Fig. 5 shows a plan view of the same taken on the line 5—5 of Fig. 4.

An alternative embodiment of my invention is shown in Figs. 4 and 5 which illustrate a second form of solid-$CO_2$ chilling unit 30 which may be used in place of form 3 shown in Figs. 1, 2 and 3.

A rectangular tank 31 is divided by a partition 32 of insulating material into a solid-$CO_2$ compartment 33 and a brine compartment 34. Partition 32 is of less height than the side walls of tank 33 and permits brine to overflow from the solid-$CO_2$ compartment to the brine compartment.

Brine inlet 35 in pipe 17 opens above the solid-$CO_2$ compartment 33, and brine is withdrawn from the brine compartment 34 through brine outlet 36 into pipe 20, substantially as described for the first embodiment.

Partition 32 is provided with a number of holes 37 which communicate between the solid-$CO_2$ and brine compartments.

The mode of operation is as follows:

The brine circulating system and solid-$CO_2$ compartment are filled with the prepared brine solution having the desired freezing point. Cakes of solid-$CO_2$ 38 are placed in compartment 33 and the brine pump 9 is started. Brine will flow into the solid-$CO_2$ compartment 33 through inlet 35.

The brine surrounding the solid-$CO_2$ will be frozen, but the ebullition of $CO_2$ gas bubbles will prevent the solid-$CO_2$ from being solidly encased. However, a fairly continuous cake 39 or multiplicity of cakes in close proximity to each other will form above the solid-$CO_2$ since the $CO_2$ bubbles can escape around its outer edges and through holes 37 in partition 32 and thus will not unduly interfere with its formation.

The brine now entering through inlet 35 will flow over this layer of frozen brine and will overflow partition 32 and pass into brine compartment 34. The rate of flow of this circulating brine prevents it from being cooled to its congealing point while passing over the frozen brine surface and the insulated partition 32 will prevent the brine in compartment 34 from becoming congealed.

The result is that a continuous circulation of liquid brine is maintained in the brine refrigerating system, and the solid-$CO_2$ chilling unit serves to extract whatever heat is absorbed by the brine in doing its refrigeration work in coil 8. By changing the brine strength, as before described, individual conditions can be met without altering the rate of flow or the solid-$CO_2$ chilling unit.

Communicating holes 37 serve not only to permit the escape of $CO_2$ gas from the solid-$CO_2$ compartment but also permit the liquid brine in the solid-$CO_2$ compartment to escape and be replaced by warmer brine from above, thus assisting in preventing the spaces at the side of the solid-$CO_2$ from becoming choked with frozen brine and interfering with the maintenance of equilibrium conditions.

My invention obviously is not restricted to the particular embodiments thereof herein illustrated and described.

In the claims it will be understood that by "a circulating low freezing liquid refrigerant" is meant a refrigerant employed for doing refrigeration work external to the space surrounding the solid-$CO_2$ chilling unit and one having a freezing point well below that of water. By "bleeder openings" are meant openings similar to the holes 28 shown in Fig. 3, which permit brine to slowly leak therethrough at an aggregate rate substantially less than that of the inflowing circulating brine. By a "collector" is meant a collecting and storage tank for brine after it has been chilled, wherefrom it may be withdrawn as required for its external refrigeration work.

Having disclosed two illustrative embodiments of my invention, what I claim and desire to secure by Letters Patent is as follows:

1. A method of refrigeration comprising circulating a low-freezing liquid refrigerant in heat transfer relation with a space to be cooled, submerging solid-$CO_2$ in a portion of said refrigerant to produce the cooling effect desired, and controlling the temperature of the refrigerant by the effective exposure of the solid-$CO_2$ to said refrigerant.

2. A method of refrigeration comprising circulating a low-freezing refrigerant in heat transfer relation with space to be cooled, submerging solid-$CO_2$ in a portion of said refrigerant, and adjusting the freezing point of the refrigerant and the rate of circulation to suit the cooling effect desired.

3. A method of refrigeration comprising circulating a low-freezing liquid refrigerant in heat transfer relation with space to be cooled, submerging solid-$CO_2$ in a portion of said refrigerant thereby forming a congealed layer of the refrigerant between the solid-$CO_2$ and the circulating refrigerant, and maintaining a rate of circulation such as to prevent excess freezing of the refrigerant.

4. A method of refrigeration comprising circulating a low-freezing liquid refrigerant in heat transfer relation with space to be cooled, submerging solid-$CO_2$ in a portion of said refrigerant thereby forming a congealed layer of the refrigerant between the solid-$CO_2$ and the circulating refrigerant, conducting sublimated $CO_2$ to space to be cooled, and maintaining a rate of circulation such as to prevent excess freezing of the refrigerant.

5. A method of refrigeration comprising circulating a low-freezing liquid refrigerant in heat transfer relation with space to be cooled, submerging solid-$CO_2$ in a portion of said refrigerant thereby partially congealing it, conducting sublimated $CO_2$ to space to be cooled, adjusting the freezing point of the refrigerant to suit the cooling effect desired, and maintaining a rate of circulation such as to prevent excess freezing of the refrigerant.

6. A method of refrigeration comprising circulating a low-freezing liquid refrigerant in heat transfer relation with space to be cooled, submerging solid-$CO_2$ in a portion of said refrigerant thereby partially congealing it, adjusting the freezing point of the refrigerant to suit the cooling effect desired, and maintaining a rate of circulation such as to prevent excess freezing of the refrigerant.

7. A method for chilling a circulating low-freezing brine refrigerant comprising submerging solid-$CO_2$ in a portion of the brine, thereby substantially congealing the latter and forming a surface of frozen brine above the solid-$CO_2$, circulating the brine to be chilled thereover and withdrawing the chilled brine at a sufficient rate to prevent appreciable congealing, withdrawing the $CO_2$ gas formed by the sublimating solid-$CO_2$ from beneath the frozen brine surface so as not to interfere therewith, initially adjusting the brine strength and hence its freezing point so that the temperature gradient between the frozen brine surface and the liquid brine to be chilled will result in the latter being chilled to the desired degree at its predetermined rate of circulation and area of chilling exposure.

8. A method for chilling a circulating low-freezing brine refrigerant comprising submerging solid-$CO_2$ in a portion of the brine, thereby substantially congealing the latter and forming a surface of frozen brine above the solid-$CO_2$, circulating the brine to be chilled thereover and withdrawing the chilled brine at a sufficient rate to prevent appreciable congealing, initially adjusting the brine strength and hence its freezing point so that the temperature gradient between the frozen brine surface and the brine to be chilled will result in the latter being chilled to the desired degree at its predetermined rate of circulation and area of chilling exposure.

9. A method for chilling a circulating low-freezing liquid refrigerant comprising submerging solid-$CO_2$ in a portion of the refrigerant, thereby partially congealing the latter and forming a surface of frozen refrigerant above the solid-$CO_2$, circulating the refrigerant to be chilled thereover and withdrawing the chilled refrigerant at a sufficient rate to prevent appreciable congealing, withdrawing the $CO_2$ gas formed by the sublimating solid-$CO_2$ from beneath the frozen refrigerant surface, so as not to interfere therewith, said liquid refrigerant having a freezing point such that the temperature gradient between the frozen refrigerant surface and the refrigerant to be chilled will result in the latter being chilled to the desired degree at its predetermined rate of circulation and area of chilling exposure.

10. A method for chilling a circulating low-freezing liquid refrigerant comprising submerging solid-$CO_2$ in a portion of the refrigerant, thereby partially congealing the latter and forming a surface of frozen refrigerant above the solid-$CO_2$, circulating the refrigerant to be chilled thereover and withdrawing the chilled refrigerant at a sufficient rate to prevent appreciable congealing, said liquid refrigerant having a freezing point such that the temperature gradient between the frozen refrigerant surface and the liquid refrigerant to be chilled will result in the latter being chilled to the desired degree at its predetermined rate of circulation and area of chilling exposure.

11. A chilling unit for a refrigerating apparatus comprising brine circulating means, a compartment for solid-$CO_2$ into which said brine is discharged, said compartment being deep enough to at least partially submerge the solid-$CO_2$, overflow means from said compartment, a collector for the brine flowing from the solid-$CO_2$ compartment and passage means therebetween, sufficient insulating means therebetween to prevent freezing of the brine in the collector, and an outlet from the collector for the chilled circulating brine.

12. A chilling unit for a refrigerating apparatus comprising brine circulating means, a compartment for solid-$CO_2$ into which said brine is discharged, said compartment being deep enough to submerge the solid-$CO_2$, overflow means from said compartment, a collector for the brine flowing from the solid-$CO_2$ compartment and passage means therebetween, sufficient insulating means therebetween to prevent the freezing of the brine in the collector, an outlet from the collector for the chilled circulating brine, and means for collecting escaping vaporized $CO_2$ for use as a refrigerant gas.

13. Means for chilling a circulating low-freezing brine refrigerant with solid-$CO_2$, comprising a compartment for the solid-$CO_2$ and the submerging brine, an inlet at the top thereof for the circulating-brine to be chilled, a circulating-brine compartment to the side thereof and separated therefrom by an insulated partition of such height as to cause the brine to overflow from the solid-$CO_2$ compartment only to the circulating-brine compartment, bleeder openings in spaced relationship in said partition, and an outlet from said circulating-brine compartment.

14. Means for chilling a circulating low-freezing brine refrigerant with solid-$CO_2$, comprising a compartment for the solid-$CO_2$ and the submerging-brine, an inlet at the top thereof for the circulating-brine to be chilled, means for allowing the liquid therein to overflow said compartment and a plurality of bleeder openings in spaced relationship in the lower part of the side walls thereof, an open chamber spaced beneath the solid-$CO_2$ compartment and of greater area so as to collect the brine flowing over the upper edges and through the bleeder openings of the latter, and an outlet from said collecting chamber for the chilled circulating-brine.

15. Means for chilling a circulating low-freezing liquid refrigerant with solid-$CO_2$, comprising a compartment for the solid-$CO_2$ and the submerging refrigerant, an inlet at the top thereof for the circulating-referigerant to be chilled, means for allowing the liquid therein to overflow said compartment and a plurality of bleeder openings in the walls thereof, a collector for the liquids flowing from the solid-$CO_2$ compartment and passage means therebetween, sufficient insulating means therebetween to preclude the freezing of the liquid in the collector, and an outlet from the collector for the chilled circulating-liquid.

16. An insulated refrigerator cabinet containing a chilling unit as specified in claim 11, which chilling unit when solid-$CO_2$ is placed therein serves simultaneously to cool the space within the refrigerator cabinet and to chill a low-freezing liquid-refrigerant circulated for external cooling purposes.

17. An insulated refrigerator cabinet containing a chilling unit as specified in claim 11, which chilling unit when solid-$CO_2$ is placed therein and submerged in brine serves simultaneously to generate $CO_2$ vapor, cool the space within the refrigerator cabinet and to chill said brine whereby the latter may be circulated for external cooling purposes.

18. A combination solid-$CO_2$ cooled refrigerator compartment and external brine cooled refrigerating means, comprising an insulated cabinet, a chilling unit as specified in claim 9 placed in the upper part thereof, a pipe connecting the outlet of said unit to a circulating-pump, a refrigerating coil external to the solid-$CO_2$ refrigerator cabinet, pipes connecting the inlet of said coil to the pump and the outlet to the inlet of the chilling unit, and a low-freezing brine solution circulated through the chilling unit and the external refrigerating coils by means of the pump, whereby masses of solid-$CO_2$ placed in said chilling unit will simultaneously cool the cabinet, chill the circulating brine and freeze the entrapped submerging brine.

19. A combination ice cream manufacturing and hardening apparatus comprising a medium temperature ice cream manufacturing apparatus, means for conducting chilled brine therethrough, including a brine inlet and outlet thereof, an insulated low temperature hardening cabinet external thereto and provided with a removable top permitting the insertion and removal of ice cream cans, a brine-chilling unit as specified in claim 11 placed in the upper part of such hardening cabinet, a brine transfer pump connected to the outlet of the brine-chilling unit and the brine-inlet of the manufacturing apparatus, a pipe connecting the brine-outlet of the manufacturing apparatus to the inlet of the brine chilling unit, and a brine solution for circulation as described, whereby masses of solid-$CO_2$ may be placed in the chilling unit for simultaneously cooling and hardening the ice cream within the hardening cabinet and chilling the brine solution circulated through the manufacturing apparatus by means of the pump.

20. A method of refrigerating a circulating fluid by means of solid-$CO_2$, comprising maintaining a substantially non-circulating layer of at least partially congealed liquid refrigerant between the solid-$CO_2$ and the circulating fluid and in direct contact with the solid-$CO_2$, the rate of refrigeration being controllable by adjustment of the freezing point of said non-circulating liquid refrigerant.

21. A method of refrigerating a circulating fluid by means of solid-$CO_2$, comprising maintaining a substantially non-circulating layer of at least partially congealed liquid refrigerant between the solid-$CO_2$ and the circulating fluid and in direct contact with the solid-$CO_2$, whereby the rate of refrigeration will be maintained substantially constant, depending upon the freezing point of said liquid refrigerant.

In testimony whereof, I have signed my name to this specification.

ALMON J. CORDREY.

CERTIFICATE OF CORRECTION.

Patent No. 1,903,170. March 28, 1933.

ALMON J. CORDREY.

It is hereby certified that error appears in the printed specification of the above numbered patent requiring correction as follows: Page 5, line 48, claim 18, for the number "9" read "11"; and that the said Letters Patent should be read with this correction therein that the same may conform to the record of the case in the Patent Office.

Signed and sealed this 16th day of May, A. D. 1933.

(Seal)

M. J. Moore.
Acting Commissioner of Patents.